United States Patent
Yoshii et al.

(10) Patent No.: US 9,152,087 B2
(45) Date of Patent: Oct. 6, 2015

(54) TONER TRANSPORTATION DEVICE AND IMAGE FORMING APPARATUS EQUIPPED WITH THE SAME

(71) Applicant: Kyocera Document Solutions Inc., Osaka (JP)

(72) Inventors: Tatsuhiko Yoshii, Osaka (JP); Koji Murata, Osaka (JP); Naoki Yamane, Osaka (JP)

(73) Assignee: Kyocera Document Solutions Inc., Osaka (JP)

( * ) Notice: Subject to any disclaimer, the term of this patent is extended or adjusted under 35 U.S.C. 154(b) by 81 days.

(21) Appl. No.: 13/863,052

(22) Filed: Apr. 15, 2013

(65) Prior Publication Data

US 2013/0272764 A1 Oct. 17, 2013

(30) Foreign Application Priority Data

Apr. 16, 2012 (JP) ................. 2012-092715

(51) Int. Cl.
| | |
|---|---|
| G03G 21/00 | (2006.01) |
| G03G 15/08 | (2006.01) |
| G03G 21/10 | (2006.01) |
| B65G 33/14 | (2006.01) |
| B65G 33/32 | (2006.01) |

(52) U.S. Cl.
CPC .......... *G03G 15/0891* (2013.01); *B65G 33/14* (2013.01); *B65G 33/32* (2013.01); *G03G 21/105* (2013.01); *G03G 2215/0827* (2013.01); *G03G 2215/0833* (2013.01)

(58) Field of Classification Search
CPC .......... G03G 15/0889; G03G 15/0891; G03G 15/104; G03G 21/10; G03G 21/105; G03G 2215/0816; G03G 2215/0827; G03G 2215/085; B65G 33/14; B65G 33/32
USPC .............. 399/256, 258, 358, 359; 366/156.1, 366/245, 247, 319, 330.2; 141/79; 29/889, 29/889.1, 453; 414/326; 198/657, 672, 198/673
See application file for complete search history.

(56) References Cited

U.S. PATENT DOCUMENTS

| | | | | |
|---|---|---|---|---|
| 3,306,433 | A | * 2/1967 | Blanshine | ....... 198/673 |
| 4,220,242 | A | * 9/1980 | Forsberg | ....... 198/666 |
| 5,318,444 | A | 6/1994 | Kuzub et al. | |

(Continued)

FOREIGN PATENT DOCUMENTS

| | | | |
|---|---|---|---|
| JP | 01267670 A | * | 10/1989 |
| JP | 10-307521 | | 11/1998 |

(Continued)

*Primary Examiner* — Robert Beatty
(74) *Attorney, Agent, or Firm* — K&L Gates LLP

(57) ABSTRACT

A toner transportation device according to the present disclosure includes a transportation screw that has a rotational shaft and a transportation fin formed on an outer circumferential surface of the rotational shaft and a toner transportation pipe that has a circular shape in cross section. The transportation screw is rotatably positioned in the toner transportation pipe. A support member is attached to the rotational shaft that has a bearing portion having an annular shape and rotatably fitted onto the rotational shaft and that has a plurality of leg portions radially protruding outward from an outer circumferential surface of the bearing portion. A distance between an axis of the rotational shaft and a tip of each leg portion is greater than a radius of the transportation fin and equal to or less than a radius of an inner circumferential surface of the toner transportation pipe.

7 Claims, 5 Drawing Sheets

(56) References Cited

U.S. PATENT DOCUMENTS

| | | | | |
|---|---|---|---|---|
| 5,543,898 | A * | 8/1996 | Shishido et al. | 399/111 |
| 5,685,382 | A * | 11/1997 | Deeter | 175/394 |
| 6,070,035 | A * | 5/2000 | Fujita et al. | 399/258 |
| 6,712,495 | B2 * | 3/2004 | Leveque | 366/81 |
| 7,693,477 | B2 * | 4/2010 | Chatani et al. | 399/358 |
| 7,881,640 | B2 * | 2/2011 | Iwata et al. | 399/254 |
| 8,571,446 | B2 * | 10/2013 | Iwata | 399/256 |
| 2013/0216288 | A1 * | 8/2013 | Murata et al. | 399/358 |

FOREIGN PATENT DOCUMENTS

| | | | |
|---|---|---|---|
| JP | 2000-147969 | | 5/2000 |
| JP | 2002055519 A | * | 2/2002 |
| JP | 2002-132109 | | 5/2002 |
| JP | 2005-091809 | | 4/2005 |
| JP | 2007101928 A | * | 4/2007 |
| JP | 2008268657 A | * | 11/2008 |
| JP | 3154496 | | 10/2009 |
| JP | 2012-053316 | | 3/2012 |

* cited by examiner

TONER TRANSPORTATION DEVICE AND IMAGE FORMING APPARATUS EQUIPPED WITH THE SAME

INCORPORATION BY REFERENCE

This application is based upon, and claims the benefit of priority from, corresponding Japanese Patent Application No. 2012-092715 filed in the Japan Patent Office on Apr. 16, 2012, the entire contents of which are incorporated herein by reference.

BACKGROUND

The present disclosure relates to toner transportation devices used in image forming apparatuses such as copiers, printers, facsimile machines, and multi-function machines that perform the functions of these devices.

In typical electrophotographic image forming apparatuses, an electrostatic latent image formed on an image carrying body such as a photoconductor drum is visualized by the developing device, typically using a powdery developer. The visualized image (toner image) is transferred to a recording medium and then fixed. Toner remaining on the surface of the image carrying body is removed by a cleaning device so as to form a new toner image. The residual toner removed by the cleaning device is stored in a waste toner bottle. When the waste toner bottle becomes full after a specified number of sheets have been printed, the user is notified of the full state, and the waste toner bottle is replaced and discarded.

A known toner transportation device uses a toner transportation path equipped with a transportation screw located in a pipe-shaped transportation path as a waste toner collection path from a cleaning device to a waste toner bottle. In such a toner transportation path, the locus of an outer circumferential edge of the transportation screw formed while the transportation screw is being rotated may become larger than the inner diameter of the transportation path due to, for example, a dimensional error in the outer diameter of the transportation screw or the inner diameter of the transportation path, or bowing of the transportation screw. In this situation, the transportation screw may not be able to rotate due to an excessive rotational load generated by friction. Thus, the outer diameter of the transportation screw is usually designed to be smaller than the inner diameter of the transportation path.

However, with such a design, there is a clearance (gap) formed between the transportation screw and the transportation path. Thus, when the transportation screw is bowed, the transportation screw swings in the radial directions (becomes eccentric) while being rotated. As a result, the transportation screw hits the inner surface of the transportation path and noise may be generated.

More specifically, when the transportation screw is bowed in a downwardly position, bending due to the weight of the transportation screw itself is added in the same direction as that of the bowing, thereby increasing the amount of deformation. In contrast, when the transportation screw is in an upwardly bowed position, bending due to the weight of the transportation screw itself acts in a direction opposite to the direction of the bowing, thereby decreasing the amount of bowing. Accordingly, when the transportation screw is rotated from the upwardly bowed position, the state of the transportation screw gradually changes from a balanced state, where the amount of deformation is small, into a state where bending due to the weight of the transportation screw increases the bowing. Thus, the transportation screw undergoes significant wave-like deformation while being rotated and hits the inner surface of the transportation path. At this time, noise generated due to the hitting becomes larger as the bowing is increased, the clearance (gap) between the transportation screw and the inner surface of the transportation path is increased, and the weight of the transportation screw is increased.

In view of the above-described situation, a proposed first exemplified toner transportation device has a portion, in which an outer edge of a spiral protrusion (spiral fin) of the transportation screw and an inner face of a cylindrical transportation path are in close proximity with each other. This allows the transportation screw to be stably rotated while part of the outer edge of the transportation screw is in contact with the inner face of the cylindrical transportation path.

A proposed second exemplified toner transportation pipe has a pipe main body having a semi-tubular portion and a semi-tubular lid body joined to the semi-tubular portion of the pipe main body. The plane where the pipe main body and the semi-tubular lid body are joined to each other is substantially flat, and the pipe main body and the tubular lid body are joined to each other by ultrasonic welding so that the toner transportation pipe has good air tightness and dimensional accuracy.

Furthermore, in a proposed third exemplified developer transportation device, a bearing that receives a shaft end portion of a transportation screw has a space so as to allow a developer to pass through the space. Thus, the developer can be smoothly transported while vibration due to rotation of the transportation screw is suppressed.

However, in the first and second examples, there is a limit in setting the clearance between the transportation screw and the cylindrical transportation path due to the dimensional tolerance of component and the assembly tolerance. When bowing of the transportation screw exceeds the clearance, the transportation screw hits the inner surface of the transportation path. Thus, the noise due to the hitting is not necessarily reliably prevented. In the first example, the portion, in which the outer diameter of the spiral fin and the inner diameter of the cylindrical transportation path are in proximity with each other, is formed over the entire periphery at a portion in the axial direction of the cylindrical transportation path. Thus, toner tends to clog the transportation path, thereby increasing the rotational load of the transportation screw. As a result, the fluidity of the toner is decreased by frictional heat, and accordingly, transportation efficiency is degraded. When the toner is left in this state for a long time, there is a possibility of the toner being caked.

With the structure of the third example, since the bearing allows the developer to pass therethrough, vibration at the end portion of the transportation screw can be suppressed. However, it is thought that the above-described deformation of the central portion of the transportation screw caused by bowing of the transportation screw and bending due to the weight of the transportation screw cannot be suppressed. Also in the third example, the bearing has an annular shape, the outer circumferential surface of which is fitted into the developer transportation path and the inner circumferential surface of which slides against a rotational shaft of the transportation screw. Thus, there is a possibility of the entire periphery of the rotational shaft rubbing against the inner circumferential surface of the bearing, thereby increasing the rotational load.

In the above-described situations, the toner transportation path equipped with the transportation screw in the pipe-shaped transportation path is used for the waste toner transportation path from the cleaning device to the waste toner bottle. However, use of the toner transportation path equipped with the transportation screw in the pipe-shaped transportation path is not limited to the waste toner transportation path.

In image forming apparatuses, a toner cartridge is provided in order for a developing device to be replenished with toner. A similar situation is also observed in the situation where the toner transportation path equipped with the transportation screw in the transportation pipe is used in a toner replenishment path, which is used when the developing device is replenished with toner from a toner cartridge in accordance with the consumption of toner in the developing device.

SUMMARY

A toner transportation device according to an embodiment of the present disclosure includes a transportation screw that has a rotational shaft and a transportation fin formed on an outer circumferential surface of the rotational shaft and a toner transportation pipe that has a circular shape in cross section. The transportation screw is rotatably positioned in the toner transportation pipe. A support member is attached to the rotational shaft that has a bearing portion having an annular shape and rotatably fitted onto the rotational shaft and that has a plurality of leg portions radially protruding outward from an outer circumferential surface of the bearing portion. A distance between an axis of the rotational shaft and a tip of each leg portion is greater than a radius of the transportation fin and equal to or less than a radius of an inner circumferential surface of the toner transportation pipe.

An image forming apparatus according to an embodiment of the present disclosure is equipped with the above-described toner transportation device.

Additional features and advantages are described herein, and will be apparent from the following Detailed Description and the figures.

DETAILED DESCRIPTION

Figure 1:
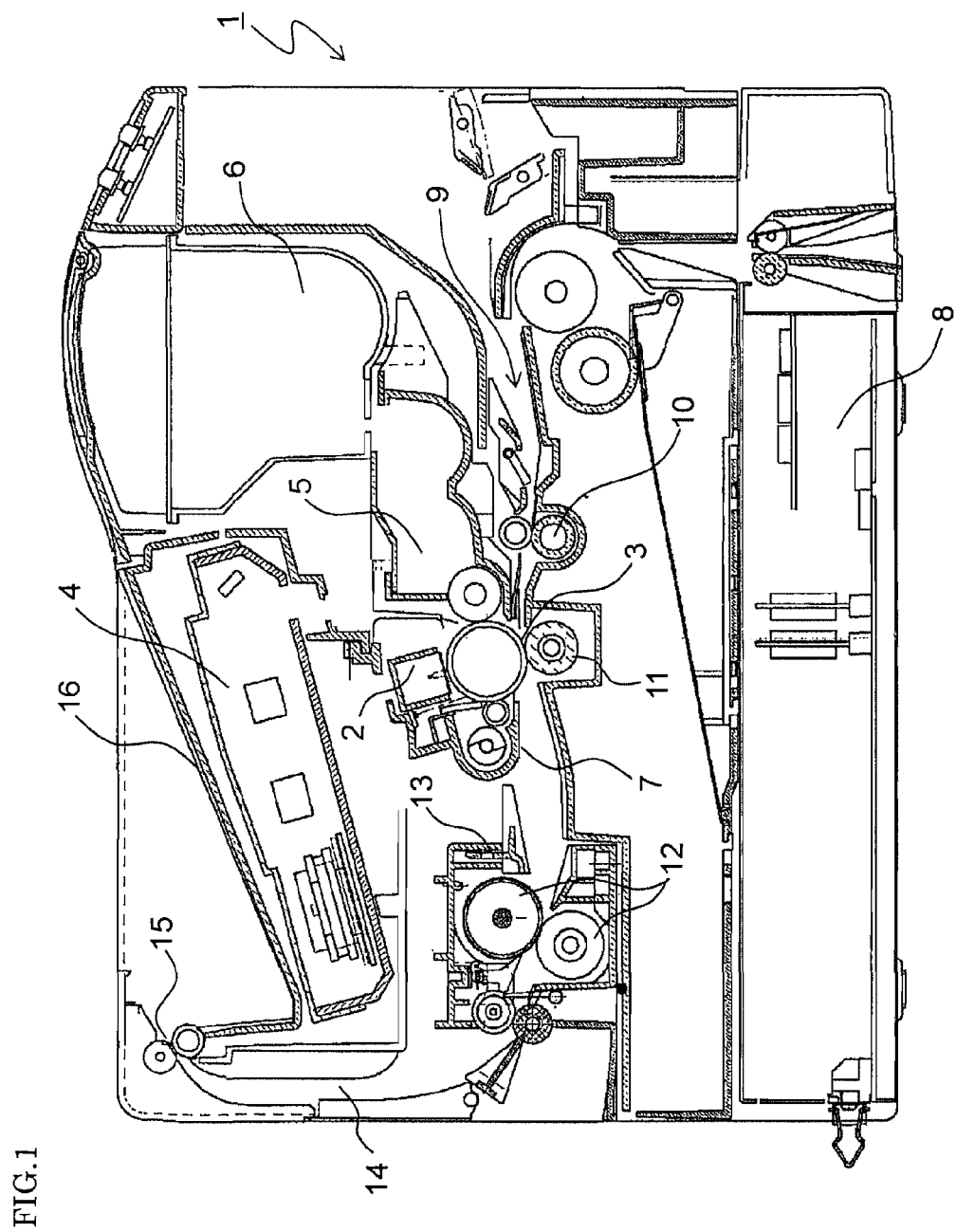
FIG. 1 is a sectional view generally illustrating a structure of an image forming apparatus equipped with a toner transportation device according to an embodiment of the present disclosure.

An embodiment according to the present disclosure will be described below with reference to the drawings. FIG. 1 is a sectional view generally illustrating the structure of an image forming apparatus 1 according to an embodiment of the present disclosure. In the image forming apparatus (for example, a monochrome printer) 1, when an image forming operation is performed, a photoconductor drum 3, which is rotated clockwise in FIG. 1, is uniformly charged by a charger unit 2. Then, an exposure unit (laser scanning unit or the like) 4 emits a laser beam in accordance with image data so as to form an electrostatic latent image on the photoconductor drum 3. A developing unit 5 causes a developer (referred to as "toner" hereafter) to adhere to the electrostatic latent image, thereby a toner image is formed.

The toner is supplied from a toner container 6 to the developing unit 5. The image data is transmitted from a personal computer (not shown) or the like. A static eliminator (not shown), which removes charges remaining on the surface of the photoconductor drum 3, is provided downstream of a cleaning device 7 with respect to a rotational direction of the photoconductor drum 3.

A sheet (transfer paper, overhead transparency (OHP) film, or the like) is fed from a sheet feed cassette 8 toward the photoconductor drum 3, on which the toner image has been formed, through a sheet conveying path 9. A registration roller pair 10 adjusts the timing at which the sheet is fed to a transfer roller 11 (image transfer unit). The transfer roller 11 causes the toner image formed on the surface of the photoconductor drum 3 to be transferred onto the sheet. The sheet, onto which the toner image has been transferred, is separated from the photoconductor drum 3 and fed to a fixing unit 13 having a fixing roller pair 12, so that the toner image is fixed. The sheet having passed through the fixing unit 13 is fed through a sheet conveying path 14 to an upper portion of the apparatus and ejected to a discharge tray 16 by a discharge roller pair 15.

Toner remaining on the surface of the photoconductor drum 3 is removed by the cleaning device 7. After the charges remaining on the photoconductor drum 3 have been removed by the static eliminator (not shown), the photoconductor drum 3 is charged again by the charger unit 2. After that, image formation is performed similarly to the above-described procedure.

The photoconductor drum 3 may be formed by, for example, a photoreceptor of an aluminum drum and an amorphous silicon (a-Si) layer deposited on the outer circumferential surface of the aluminum drum. In another instance, as the photoconductor drum 3, a photoconductor drum formed by coating organic photoconductor (OPC) may be used. The surface of the photoconductor drum 3 is charged by the charger unit 2. By irradiating the surface of the photoconductor drum 3 with the laser beam from the exposure unit 4, an electrostatic latent image, where charges are attenuated, is formed on the surface of the photoconductor drum 3. The charger unit 2 charges the surface of the photoconductor drum 3 through electric discharge (for example, corona discharge) caused by, for example, applying a high voltage to a thin wire or the like as an electrode.

The exposure unit 4 irradiates the photoconductor drum 3 with a light beam (for example, laser beam) based on the image data so as to form an electrostatic latent image on the surface of the photoconductor drum 3. The developing unit 5 includes a developing roller that opposes the photoconductor drum 3. The developing unit 5 causes the developer contained therein to adhere to the electrostatic latent image on the photoconductor drum 3 using the developing roller, thereby forming a toner image.

The cleaning device 7 removes the toner (residual toner) remaining on the surface of the photoconductor drum 3 after the toner image has been transferred onto the sheet. The details of the structure of the cleaning device 7 will be described later.

In the fixing unit 13, a fixing roller pair 12 is provided in a housing. The fixing roller pair 12 includes a heating roller, which has a halogen lamp or the like disposed therein and rotates clockwise in FIG. 1, and a pressure roller, which rotates counterclockwise in FIG. 1. The sheet onto which the toner image has been transferred by the transfer roller 11 is fed to the fixing unit 13 and passes through a fixing nip between the fixing roller pair 12. At this time, the toner image on the sheet is heated and pressed at a specified temperature and a specified pressure so as to be fused and fixed to the sheet as a permanent image.

Figure 2:
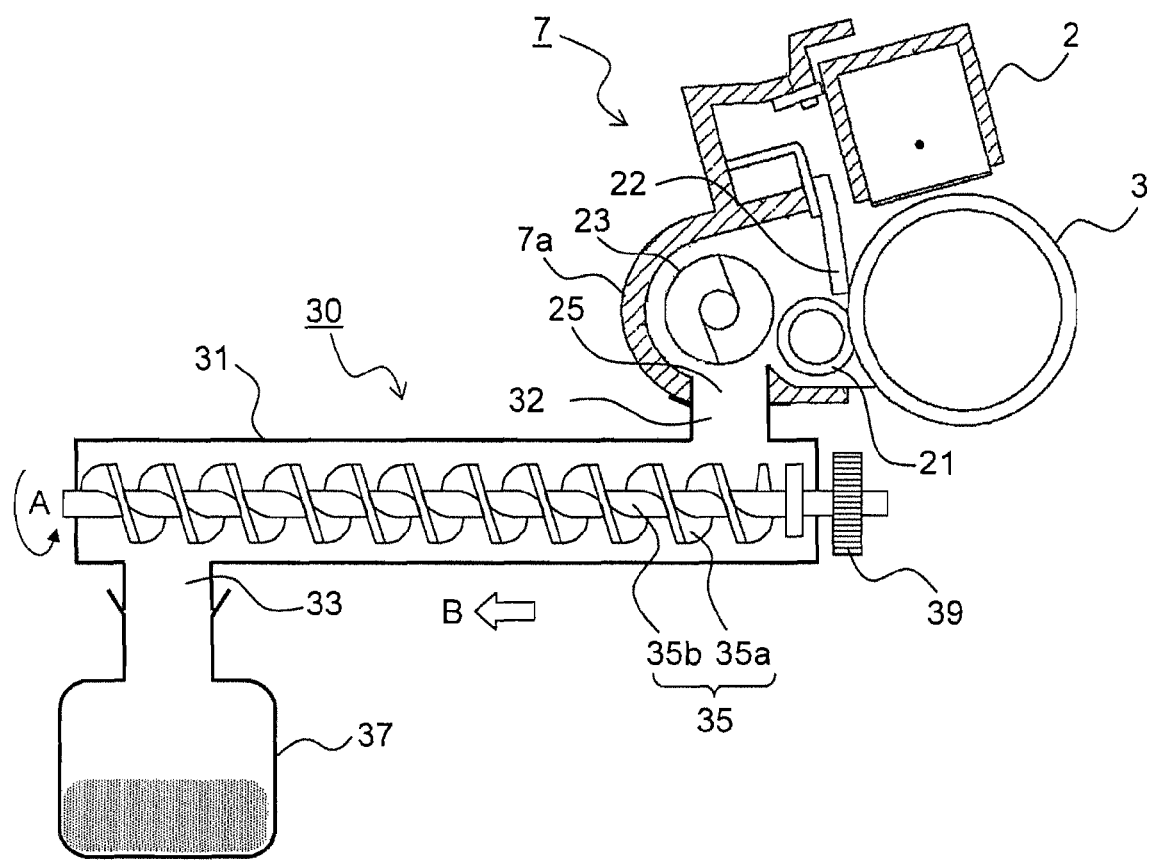
FIG. 2 is a side sectional view illustrating the structures of the toner transportation device according to an embodiment of the present disclosure, a cleaning device connected to the toner transportation device, and components near the cleaning device.

FIG. 2 is a sectional view of a main portion illustrating the structures of the cleaning device 7 and components near the cleaning device 7 including a toner transportation device 30 according to the present disclosure. The cleaning device 7 includes in a housing 7a a wiping roller 21, a cleaning blade 22, and a collection screw 23. The wiping roller 21 is in line contact with the photoconductor drum 3 in the longitudinal direction using a spring (not shown).

The wiping roller 21 is in pressure contact with the photoconductor drum 3 at a specified pressure. The wiping roller 21 is rotated (forward rotation) by a drive unit (not shown) in the same direction as that of the photoconductor drum 3 at a surface where the wiping roller 21 and the photoconductor drum 3 are in contact with each other. The circumferential speed of the wiping roller 21 is controlled so as to be greater than (here, 1.2 times) that of the photoconductor drum 3. The wiping roller 21 has a structure in which, for example, a foam layer as a roller body formed of an ethylene-propylene terpolymer (EPDM) rubber having an Asker C hardness of 55° is formed around a metal shaft. The material of the roller body is not limited to EPDM rubber. Alternatively, the roller body may be formed of a rubber of another material or a foamed rubber body. The asker C hardness of the material of the rubber body is preferably in a range from 10° to 90°.

The cleaning blade 22 is secured at a position downstream, with respect to the rotational direction of the photoconductor drum 3, of the surface where the photoconductor drum 3 is in contact with the wiping roller 21. The cleaning blade 22 is secured such that the cleaning blade 22 is in contact with the photoconductor drum 3. The cleaning blade 22 uses, for example, a blade formed of a polyurethane rubber having a Japanese Industrial Standards (JIS) hardness of 78°. At a point where the cleaning blade 22 is in contact with the photoconductor drum 3, the cleaning blade 22 is inclined relative to the tangential direction of the photoconductor drum 3 at a specified angle. The material, hardness, and dimensions of the cleaning blade 22, the amount by which the cleaning blade 22 is pushed into the photoconductor drum 3, the force by which the cleaning blade 22 is pressed against the photoconductor drum 3, and the like are appropriately set based on the specifications of the photoconductor drum 3.

Residual toner having been scraped off from the surface of the photoconductor drum 3 by the wiping roller 21 or the cleaning blade 22 drops due to gravity and gradually accumulates in the housing 7a. The toner in the housing 7a is transported in order in the longitudinal direction (a direction perpendicular to the page of FIG. 2) of the housing 7a by rotation of the collection screw 23. Then, the residual toner is discharged to the outside of the cleaning device 7 through a toner discharge portion 25 provided at an end of the bottom surface of the housing 7a.

The toner transportation device 30 includes a toner transportation pipe 31 and a transportation screw 35. The toner transportation pipe 31 has a toner input port 32 and a toner output port 33 formed at one and the other end respectively. The toner input port 32 is connected to the toner discharge portion 25 of the cleaning device 7. The toner output port 33 is connected to a waste toner bottle 37. The transportation screw 35 has a transportation fin (spiral fin) 35a and a rotational shaft 35b, which extends through the center of the transportation fin 35a. The rotational shaft 35b is supported by bearings (not shown) provided at both ends in the longitudinal direction. With this structure, the transportation screw 35 is rotatable in the toner transportation pipe 31. An end of the rotational shaft 35b extends to the outside of the toner transportation pipe 31, and a drive input gear 39 is attached to the tip of the rotational shaft 35b that extends out of the toner transportation pipe 31. The drive input gear 39 is connected to a drive motor (not shown), thereby the transportation screw 35 is rotated at a specified speed. By rotating the transportation screw 35 in the direction indicated by arrow A in FIG. 2, the toner having been transported from the cleaning device 7 into the toner transportation pipe 31 through the toner input port 32 is transported in order in the toner transportation pipe 31 in the arrow B direction. Then, the toner having been transported is stored in the waste toner bottle 37 through the toner output port 33.

Figure 3:
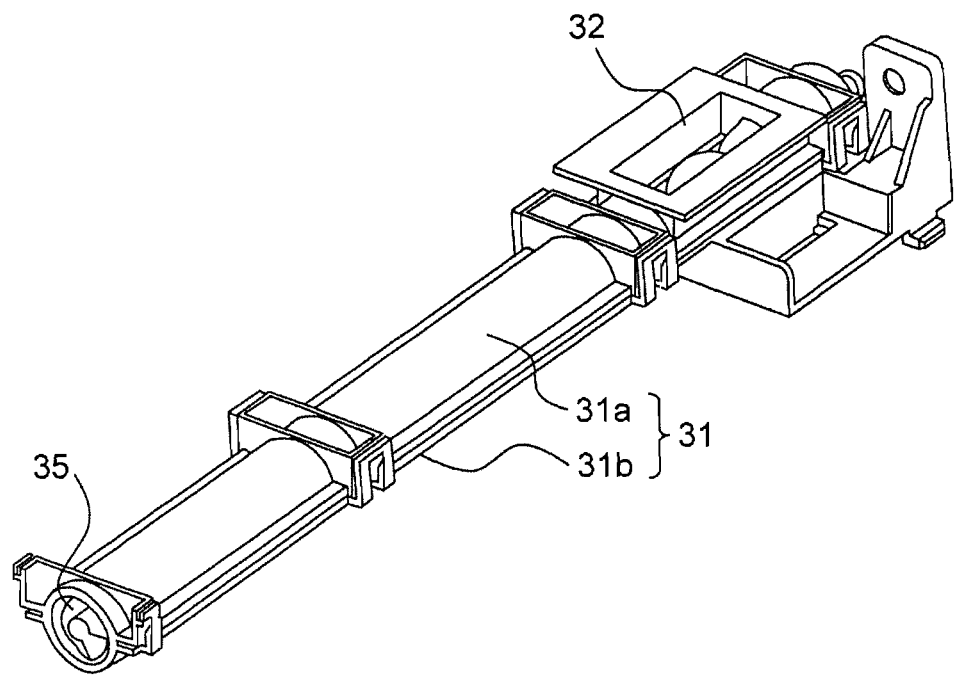
FIG. 3 is a perspective view of a toner transportation pipe included in the toner transportation device according to an embodiment of the present disclosure with the toner transportation pipe cut in a substantially central portion in the longitudinal direction thereof.
Figure 4:
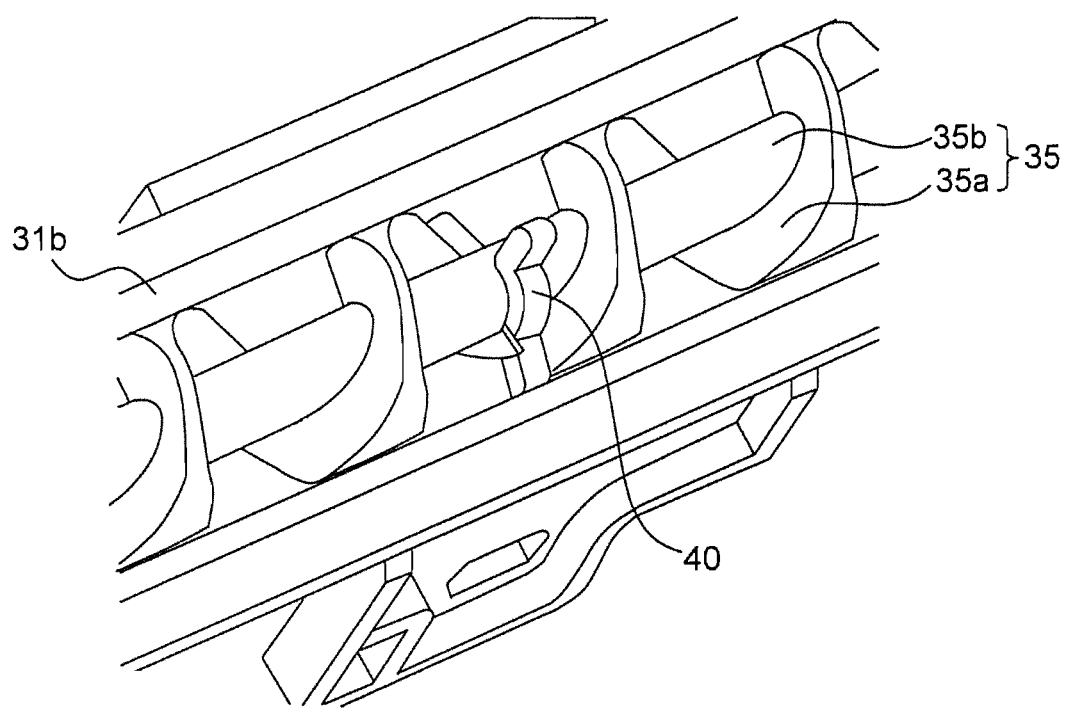
FIG. 4 is a perspective view of part of the toner transportation pipe with an upper pipe removed.
Figure 5:
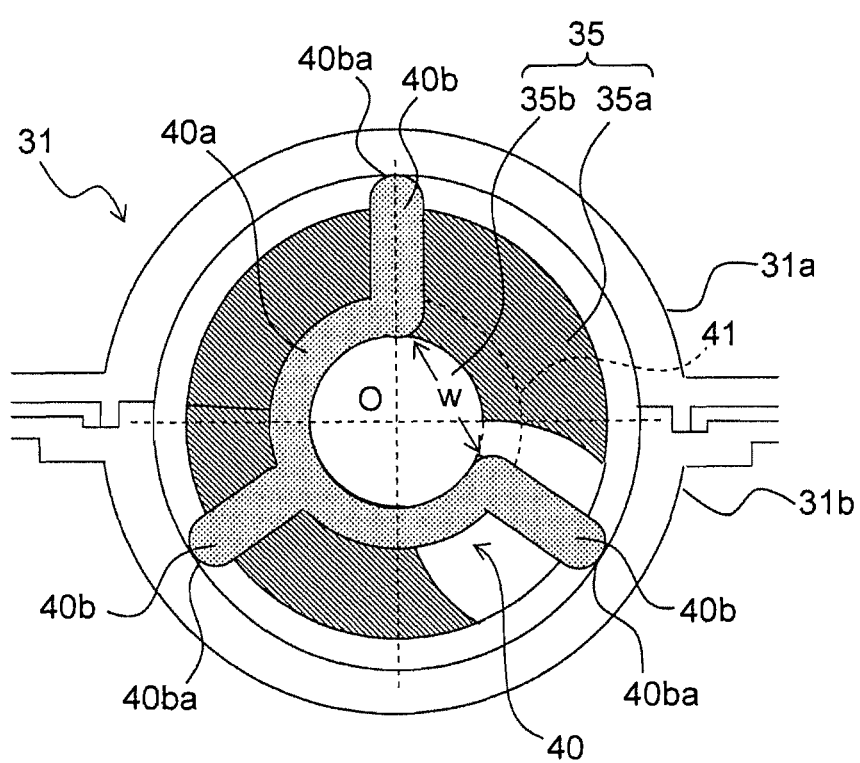
FIG. 5 is a front view of the section of the toner transportation pipe seen in the axial direction of the transportation screw with the toner transportation pipe cut at a position corresponding to a support member.

FIG. 3 is a perspective view of the toner transportation pipe 31 used in the toner transportation device 30 according to an embodiment of the present disclosure with the toner transportation pipe 31 cut in a substantially central portion in the longitudinal direction thereof. FIG. 4 is a perspective view of the toner transportation pipe 31 used in the toner transportation device 30 according to the present disclosure with an upper pipe 31a removed. FIG. 5 is a front view of the section of the toner transportation pipe 31 seen in the axial direction of the transportation screw 35 with the toner transportation pipe 31 cut at a position corresponding to a support member 40. In FIG. 5, 0° is defined as a perpendicular direction extending from the axis O of the rotational shaft 35b to the upper pipe 31a. The angle with respect to 0° increases in the clockwise direction.

The toner transportation pipe 31 has a cylindrical shape formed by combining the upper pipe 31a and a lower pipe 31b, which each have a semi-arc shape in section. The support member 40 is secured to the rotational shaft 35b of the transportation screw 35 in a substantially central portion in the longitudinal direction of the rotational shaft 35b. The support member 40 has a bearing portion 40a and three leg portions 40b. The bearing portion 40a has an annular shape and has an omitted portion 41 where part of the annular shape is omitted. The omitted portion 41 is continuously formed in the axial direction (a direction perpendicular to the page of FIG. 5). The leg portions 40b each radially protrude outward from the outer circumferential surface of the bearing portion 40a. The width w (the width of the bi-directional arrow in FIG. 5) of the omitted portion 41 in the circumferential direction is smaller than the diameter of the rotational shaft 35b. As illustrated in FIG. 5, the width w, in the circumferential direction, is equal to the length of the bowstrings of the arc-shaped omitted portion 41 in the inner circumferential surface of the bearing portion 40a. The inner diameter of the bearing portion 40a is made to be slightly larger than the diameter of the rotational shaft 35b.

The support member 40 is formed of a synthetic resin. The omitted portion 41 of the bearing portion 40a is elastically deformed by being pushed and enlarged, thereby the support member 40 is rotatably loosely fitted onto the rotational shaft 35b. By providing in the bearing portion 40a the omitted portion 41, the width w in the circumferential direction of which is smaller than the diameter of the rotational shaft 35b as described above, the support member 40 can be attached at an arbitrary position of the rotational shaft 35b and operation in which the support member 40 is attached to the rotational shaft 35b is simplified. Furthermore, as described above, the support member 40 can be easily attached. Thus, the same support member 40 can be used for another toner transportation device 30, of which the inner diameter of the toner transportation pipe 31 and the diameter of the rotational shaft 35b of the transportation screw 35 are the same as those of the present toner transportation device 30, and accordingly, the number of types of a member can be reduced.

The support member 40 is preferably formed of a material having a lower frictional coefficient (having a good sliding property) than that of the transportation screw 35. Specifically, the support member 40 is preferably formed of a material having sliding properties and elasticity such as polyacetal, polybutylene terephthalate (PBT), or fluoroplastic. Polyacetal, which is inexpensive and generally used, is particularly preferable.

The distance between the axis O and the tip of each leg portion 40b is greater than a radius of the transportation fin 35a and equal to or less than a radius of an inner circumferential surface of the toner transportation pipe 31. That is, when the support member 40 is seen in the axial direction of the rotational shaft 35b, the individual leg portions 40b are in contact with or in the proximity of the inner circumferential surface of the toner transportation pipe 31 at 0°, 120°, and 240° rotational positions. Thus, the movement of the transportation screw 35 in the radial directions is restricted by the support member 40. In this state, the axis O of the rotational shaft 35b is substantially aligned with the axis of the toner transportation pipe 31.

During rotation of the transportation screw 35, a portion of the transportation screw 35, the portion being the portion where bowing occurs, may attempt to swing in a direction in which the bowing increases (radially outer direction) due to bending caused by its own weight because of the rotation of the transportation screw 35 beyond the uppermost point in the gravity direction. Even in this situation, with the above-described structure, the leg portions 40b of the support member 40 are brought into contact with the inner circumferential surface of the toner transportation pipe 31. This suppresses wave-like deformation of the transportation screw 35 in the radial directions caused by an interaction between the bowing and bending due to gravity. Thus, the transportation screw 35 is rotated while the rotational shaft 35b is supported by the support member 40 so that the rotational shaft 35b is maintained in a substantially straight shape. Accordingly, the occurrence of noise due to the hitting sound caused by the transportation screw 35 hitting the inner surface of the toner transportation pipe 31 can be effectively suppressed.

Here, the support member 40 is in contact with the inner circumferential surface of the toner transportation pipe 31 only at the tip of each leg portion 40b. A tip portion 40ba of each leg portion 40b has an arc shape in section seen in the axial direction of the toner transportation pipe 31. This significantly reduces the sliding load between the leg portions 40b and the inner circumferential surface of the toner transportation pipe 31. Accordingly, the situation where the rotational load of the transportation screw 35 increases or the transportation screw 35 becomes unable to rotate does not occur. Furthermore, by forming the support member 40 with a material having a frictional coefficient less than that of the transportation screw 35, the sliding load between the leg portions 40b and the inner circumferential surface of the toner transportation pipe 31 and the sliding load between the rotational shaft 35b and the inner circumferential surface of the bearing portion 40a are further decreased.

Thus, since the transportation screw 35 is smoothly rotated without the rotational load being increased, the generation of frictional heat due to rotation of the transportation screw 35 can be suppressed. Also, a decrease in fluidity of toner or caking of toner in the toner transportation pipe 31 can be effectively suppressed. Furthermore, the load of the drive motor that rotates the transportation screw 35 can be decreased.

In an embodiment, the support member 40 is located at a position in the substantially central portion of the transportation screw 35 in the longitudinal direction of the transportation screw 35. The arrangement of the support member 40 is not limited to this. A plurality of the support members 40 may be located at a plurality of positions over the entire length of the transportation screw 35 in the longitudinal direction so as to be spaced apart from one another by specified intervals. However, in most situations, bowing of the transportation screw 35 occurs in the central portion of the transportation screw 35 in the longitudinal direction. Thus, in comparison with a situation in which the support members 40 are formed near both ends in the longitudinal direction, the transportation screw 35 can be more effectively supported by forming the support member 40 in the substantially central portion of the transportation screw 35 in the longitudinal direction of the transportation screw 35. A sufficient effect should be achieved by positioning the support member 40 within a range of one third of the total length of the transportation screw 35 in a substantially central portion of the transportation screw in a longitudinal direction of the transportation screw.

In the support member 40, three leg portions 40b radially protrude from the bearing portion 40a so as to be equally spaced from one another. However, the number of the leg portions 40b is not limited to three. Two leg portions 40b may radially protrude from the bearing portion 40a so as to be equally spaced from each other. Alternatively, four or more leg portions 40b may radially protrude so as to be equally spaced from one another.

Also with respect to the structures, operations, and the like other than the above description, the present disclosure is not limited to the above-described embodiment and a variety of modifications are possible without departing from the gist of the present disclosure. In the above-described embodiment, the cleaning device 7 includes the wiping roller 21 and the cleaning blade 22. The cleaning device 7 is not limited to this configuration. For example, the toner transportation device 30 according to the present disclosure is applicable to cleaning devices of various structures such as the cleaning device 7 that includes only the cleaning blade 22 and the cleaning device 7 that includes a fur brush instead of the cleaning blade 22.

In the above-described embodiment, the spiral-shaped transportation screw 35, in which the transportation fin 35a is continuously provided around the rotational shaft 35b, is used. Alternatively, the transportation screw 35 may have the transportation fin 35a formed by arranging, for example, a plurality of semi-circular plates (having shape formed by substantially halving a circular plate) around the rotational shaft 35b at a specified inclination angle.

In the above-described embodiment, an example is described, in which the toner transportation device 30 according to the present disclosure is located in a waste toner transportation path from the cleaning device 7 to the waste toner bottle 37. However, The application of the toner transportation device 30 is not limited to this. The toner transportation device 30 is also completely similarly applicable to a toner transportation path, for example, from the toner container 6 to the developing unit 5.

The present disclosure can be utilized for toner transportation devices that include a toner transportation pipe and a transportation screw disposed in the toner transportation pipe. By utilizing the present disclosure, noise caused by a hitting The invention is claimed as follows:

1. A toner transportation device comprising:
   a transportation screw that has a rotational shaft and a transportation fin formed on an outer circumferential surface of the rotational shaft;
   a toner transportation pipe that has a circular shape in cross-section, the transportation screw being rotatably positioned in the toner transportation pipe;
   a support member is attached to the rotational shaft and the support member has a bearing portion having an annular shape and rotatably fitted onto the rotational shaft and has a plurality of leg portions radially protruding outward from an outer circumferential surface of the bearing portion, wherein a tip portion of each leg portion has an arc shape in cross-section as viewed in an axial direction of the toner transportation pipe; and
   a distance between an axis of the rotational shaft and a tip of each leg portion is greater than a radius of the transportation fin and equal to or less than a radius of an inner circumferential surface of the toner transportation pipe.

2. The toner transportation device according to claim 1, wherein the plurality of leg portions of the support member include three or more leg portions.

3. The toner transportation device according to claim 1, wherein the plurality of leg portions protrude so as to be equally spaced from one another in a circumferential direction of the bearing portion.

4. The toner transportation device according to claim 1, wherein the support member is formed of a material having a lower frictional coefficient than that of the transportation screw.

5. The toner transportation device according to claim 1, wherein the bearing portion is formed of a flexible material and has an omitted portion where part of the annular shape is omitted, the omitted portion being continuously formed in an axial direction and having a width in a circumferential direction, the width being smaller than a diameter of the rotational shaft.

6. The toner transportation device according to claim 1, wherein the support member is located within a range of one third of a total length of the transportation screw in a substantially central portion of the transportation screw in a longitudinal direction of the transportation screw.

7. An image forming apparatus comprising:
   a toner transportation device that includes
   a transportation screw that has a rotational shaft and a transportation fin formed on an outer circumferential surface of the rotational shaft;
   a toner transportation pipe that has a circular shape in cross section, the transportation screw being rotatably positioned in the toner transportation pipe;
   a support member is attached to the rotational shaft that has a bearing portion having an annular shape and rotatably fitted onto the rotational shaft and that has a plurality of leg portions radially protruding outward from an outer circumferential surface of the bearing portion, wherein a tip portion of each leg portion has an arc shape in cross-section as viewed in an axial direction of the toner transportation pipe; and
   a distance between an axis of the rotational shaft and a tip of each leg portion is greater than a radius of the transportation fin and equal to or less than a radius of an inner circumferential surface of the toner transportation pipe.

* * * * *